United States Patent
Gordon

(10) Patent No.: US 11,285,772 B2
(45) Date of Patent: Mar. 29, 2022

(54) FRONT PORTAL SPINDLE ASSEMBLY

(71) Applicant: Robby Gordon, Charlotte, NC (US)

(72) Inventor: Robby Gordon, Charlotte, NC (US)

(*) Notice: Subject to any disclaimer, the term of this patent is extended or adjusted under 35 U.S.C. 154(b) by 0 days.

(21) Appl. No.: 17/000,075

(22) Filed: Aug. 21, 2020

(65) Prior Publication Data

US 2021/0053411 A1    Feb. 25, 2021

Related U.S. Application Data

(60) Provisional application No. 62/891,074, filed on Aug. 23, 2019.

(51) Int. Cl.
*B60G 17/02*   (2006.01)
*B62D 7/18*    (2006.01)
(Continued)

(52) U.S. Cl.
CPC .............. *B60G 17/02* (2013.01); *B60G 3/18* (2013.01); *B62D 7/18* (2013.01); *B60B 27/0026* (2013.01); *B60B 27/065* (2013.01); *F16H 1/06* (2013.01)

(58) Field of Classification Search
CPC . B62D 7/18; B60G 3/145; B60G 3/18; B60G 7/001; B60G 17/02; B60G 2204/4191; B60G 2200/1322; B60G 2206/50; F16H 1/06; F16H 1/08; B60B 27/065; B60B 27/0026; B60B 35/001; B60B 35/16; B60B 35/14; B60B 35/124; B60B 35/163; B60K 17/043; B60K 17/30; B60Y 2200/124

See application file for complete search history.

(56) References Cited

U.S. PATENT DOCUMENTS 10,889,182 B1 *   1/2021   Lee ........................ B60T 1/062
2004/0026157 A1 *  2/2004   Varela .................. B60K 17/043
                                                       180/371
(Continued)

FOREIGN PATENT DOCUMENTS

CA      3069070 A1 *   7/2020   ........... B60K 17/043
CN    106043473 A  * 10/2016   ............. B62D 49/08
(Continued)

*Primary Examiner* — James A English
*Assistant Examiner* — Scott F. Underwood
(74) *Attorney, Agent, or Firm* — Rutan & Tucker LLP; Hani Z. Sayed

(57) ABSTRACT

An apparatus and methods are provided for a portal spindle assembly for a vehicle front suspension. The portal spindle assembly comprises a spindle portion that is rotatably coupled with upper and lower connecting arms. A leading-edge portion is rotatably coupled with a steering rod-end joint, such that moving the steering rod-end joint rotates the spindle assembly with respect to the upper and lower connecting arms. An inboard case and an outboard case support a pinion gear assembly that is meshed with an output gear assembly for communicating torque from a constant velocity joint to a front wheel coupled to the output gear assembly. The pinion gear assembly is aligned along a pinion axis disposed at an angle with respect to a hub axis of the output gear assembly. The angle facilitates a suspension geometry that provides a camber change of the front wheel that eliminates a change in track width.

16 Claims, 7 Drawing Sheets

(51) Int. Cl.
  *B60G 3/18*     (2006.01)
  *F16H 1/06*     (2006.01)
  *B60B 27/06*    (2006.01)
  *B60B 27/00*    (2006.01)

(56) References Cited

U.S. PATENT DOCUMENTS

| | | | |
|---|---|---|---|
| 2010/0007198 A1* | 1/2010 | Armfield | B60B 35/003 |
| | | | 301/132 |
| 2012/0181850 A1* | 7/2012 | Armfield | B60B 35/122 |
| | | | 301/132 |
| 2014/0174230 A1* | 6/2014 | Cannata | F16H 57/0441 |
| | | | 74/412 R |
| 2014/0230602 A1* | 8/2014 | Shirley | B60K 17/354 |
| | | | 74/606 R |
| 2017/0097084 A1* | 4/2017 | Eaton | B60K 17/043 |
| 2017/0248169 A1* | 8/2017 | Gordon | F16D 3/221 |
| 2020/0198396 A1* | 6/2020 | Stephan | B60B 35/163 |
| 2021/0023941 A1* | 1/2021 | Stephan | B60K 17/043 |

FOREIGN PATENT DOCUMENTS

| | | | | |
|---|---|---|---|---|
| CN | 108638839 A | * | 10/2018 | F16H 57/0486 |
| CN | 109334347 A | * | 2/2019 | |
| DE | 102004003645 A1 | * | 8/2005 | B60K 17/043 |
| DE | 102017111785 A1 | * | 12/2018 | B60G 3/20 |
| EP | 0993981 A1 | * | 4/2000 | B60K 17/043 |
| EP | 1366945 A2 | * | 12/2003 | B60K 17/043 |
| EP | 1391340 A1 | * | 2/2004 | B60K 17/043 |
| WO | WO-2016173783 A1 | * | 11/2016 | B60K 17/043 |
| WO | WO-2018140774 A1 | * | 8/2018 | B60B 35/001 |

\* cited by examiner

FRONT PORTAL SPINDLE ASSEMBLY

PRIORITY

This application claims the benefit of and priority to U.S. Provisional Application, entitled "Front Portal Spindle Assembly," filed on Aug. 23, 2019 and having application Ser. No. 62/891,074, the entirety of said application being incorporated herein by reference.

FIELD

Embodiments of the present disclosure generally relate to the field of vehicle suspension systems. More specifically, embodiments of the disclosure relate to an apparatus and methods for a front portal spindle assembly configured to improve the mechanical strength and performance of off-road drivetrains.

BACKGROUND

A double wishbone suspension is a well-known independent suspension design using upper and lower wishbone-shaped arms to operably couple a front wheel of a vehicle. Typically, the upper and lower wishbones or suspension arms each has two mounting points to a chassis of the vehicle and one mounting joint at a spindle assembly or knuckle. A shock absorber and a coil spring may be mounted onto the wishbone to control vertical movement of the front wheel. The double wishbone suspension facilitates control of wheel motion throughout suspension travel, including controlling such parameters as camber angle, caster angle, toe pattern, roll center height, scrub radius, scuff, and the like.

Double wishbone suspensions may be used in a wide variety of vehicles, including heavy-duty vehicles, as well as many off-road vehicles, as shown in FIG. 1. FIG. 1 shows an off-road vehicle 100 that is of a Side by Side variety. The Side by Side is a four-wheel drive off-road vehicle that typically seats between two and six occupants and is sometimes referred to as a Utility Task Vehicle (UTV), a Recreational Off-Highway Vehicle (ROV), or a Multipurpose Off-Highway Utility Vehicle (MOHUV). In addition to the side-by-side seating arrangement, many UTVs have seat belts and roll-over protection, and some may have a cargo box at the rear of the vehicle. A majority of UTVs come factory equipped with hard tops, windshields, and cab enclosures.

The double-wishbone suspension often is referred to as "double A-arms," although the arms may be A-shaped, L-shaped, J-shaped, or even a single bar linkage. In some embodiments, the upper arm may be shorter than the lower arm so as to induce negative camber as the suspension jounces (rises). Preferably, during turning of the vehicle, body roll imparts positive camber gain to the lightly loaded inside wheel, while the heavily loaded outer wheel gains negative camber.

The spindle assembly, or knuckle, is coupled between the outboard ends of the upper and lower suspension arms. In some designs, the knuckle contains a kingpin that facilitates horizontal radial movement of the wheel, and rubber or trunnion bushings for vertical hinged movement of the wheel. In some relatively newer designs, a ball joint may be disposed at each outboard end to allow for vertical and radial movement of the wheel. A bearing hub, or a spindle to which wheel bearings may be mounted, may be coupled with the center of the knuckle.

Constant velocity (CV) joints allow pivoting of the suspension arms and the spindle assembly, while a drive shaft coupled to the CV joint delivers power to the wheels. Although CV joints are typically used in front wheel drive vehicles, off-road vehicles such as four-wheeled buggies comprise CV joints at all wheels. Constant velocity joints typically are protected by a rubber boot and filled with molybdenum disulfide grease.

Given that off-road vehicles routinely travel over very rough terrain, such as mountainous regions, there is a desire to improve the mechanical strength and performance of off-road drivetrain and suspension systems, while at the same reducing the mechanical complexity of such systems.

SUMMARY

An apparatus and methods are provided for a portal spindle assembly for a vehicle front suspension. The portal spindle assembly comprises a spindle portion configured for being rotatably coupled with an upper connecting arm and a lower connecting arm. A leading-edge portion is configured for being rotatably coupled with a steering rod-end joint, such that moving the steering rod-end joint rotates the spindle assembly with respect to the upper connecting arm and the lower connecting arm. An inboard case and an outboard case are configured to support a pinion gear assembly within an upper opening of the inboard case and support an output gear assembly within a lower opening of the inboard case. The pinion gear assembly is meshed with the output gear assembly for communicating torque imparted to the pinion gear assembly by a constant velocity joint to the output gear assembly. The output gear assembly is engaged with a wheel hub for communicating torque from the output gear assembly to a front wheel coupled with the wheel hub. The pinion gear assembly is longitudinally aligned along a pinion axis that is disposed at an angle with respect to a hub axis of the output gear assembly. The angle between the pinion axis and the hub axis is configured to facilitate a suspension geometry that provides a camber change of the front wheel that eliminates a change in track width. A sealing surface is disposed around a perimeter of the inboard case and configured for forming a fluid-tight seal with an outboard case.

In an exemplary embodiment, a portal spindle assembly for a vehicle front suspension comprises: a spindle portion configured for being rotatably coupled with an upper connecting arm and a lower connecting arm; a leading-edge portion configured for being rotatably coupled with a steering rod-end joint; an inboard case including an upper opening for receiving a pinion gear assembly and including a lower opening for receiving an output gear assembly; a backwall configured for supporting the pinion gear assembly and the output gear assembly; and a sealing surface disposed around a perimeter of the inboard case and configured for forming a fluid-tight seal with an outboard case.

In another exemplary embodiment, the pinion gear assembly and the output gear assembly are housed within a cavity formed between the backwall and the outboard case. In another exemplary embodiment, the pinion gear assembly is configured to be engaged with an outboard constant velocity joint for communicating torque from a transaxle to the pinion gear assembly. In another exemplary embodiment, the pinion gear assembly is meshed with the output gear assembly for communicating torque from the pinion gear assembly to the output gear assembly.

In another exemplary embodiment, the output gear assembly is engaged with a wheel hub for communicating torque from the output gear to a front wheel coupled with the wheel hub. In another exemplary embodiment, the pinion gear assembly is longitudinally aligned along a pinion axis that is disposed at an angle with respect to a hub axis of the output gear assembly. In another exemplary embodiment, the output gear assembly is longitudinally aligned along the hub axis. In another exemplary embodiment, the angle between the pinion axis and the hub axis is configured to orient the outboard constant velocity joint toward the transaxle. In another exemplary embodiment, the angle between the pinion axis and the hub axis ranges between substantially 1-degree and 25-degrees. In another exemplary embodiment, the angle between the pinion axis and the hub axis is configured to facilitate a suspension geometry that provides a camber change of the front wheel that eliminates a change in track width.

In another exemplary embodiment, the lower opening is configured to receive a lower connecting arm joint for coupling the spindle portion with the lower connecting arm. In another exemplary embodiment, the lower opening includes a lower mounting hole and an upper mounting hole that are configured to receive a lower connecting arm bolt for mounting the lower connecting arm joint within the lower opening. In another exemplary embodiment, the lower mounting hole is configured to receive a misalignment spacer comprising the lower connecting arm joint. In another exemplary embodiment, the misalignment spacer includes threads configured to engage with threads disposed within the lower mounting hole.

In another exemplary embodiment, the spindle portion includes an upper mounting hole for coupling the spindle portion with the upper connecting arm. In another exemplary embodiment, the upper mounting hole is configured to receive a misalignment spacer comprising an upper connecting arm joint. In another exemplary embodiment, the misalignment spacer includes threads configured to engage with threads disposed within the upper mounting hole.

In another exemplary embodiment, the leading-edge portion includes two parallel prongs extending forward with respect to the spindle portion, the parallel prongs being configured to fixedly receive a bolt that hingedly receives the steering rod-end joint, such that moving the steering rod-end joint rotates the spindle assembly with respect to the upper connecting arm and the lower connecting arm. In another exemplary embodiment, the parallel prongs are configured to fastenably receive one or more misalignment spacers comprising the steering rod-end joint. In another exemplary embodiment, the parallel prongs are configured to fastenably receive one or more steering arm top hats for hingedly mounting the steering rod-end joint between the parallel prongs.

In another exemplary embodiment, the pinion gear assembly includes a pinion gear coupled with a constant velocity stub shaft by way of a spline adapter. In another exemplary embodiment, the spline adapter is supported at opposite ends by way of a bearing inserted into each of the upper opening and the outboard case. In another exemplary embodiment, a spacer is disposed between each bearing and the pinion gear. In another exemplary embodiment, an outboard end of the constant velocity stub shaft is rotatably mounted to the outboard case by way of a retaining bolt, a lock washer, and a bolt retainer. In another exemplary embodiment, an O-ring and an outboard cap are configured to enclose the pinion gear assembly within the outboard case. In another exemplary embodiment, an upper inboard seal and a retaining collar support the constant velocity stub shaft within the upper opening. In another exemplary embodiment, an inboard end of the constant velocity stub shaft is configured to be coupled with an outboard constant velocity joint.

In another exemplary embodiment, the output gear assembly includes an output gear coupled with a wheel hub by way of a spline adapter portion of the wheel hub. In another exemplary embodiment, the wheel hub includes multiple wheel studs configured for fastening a front wheel onto the wheel hub. In another exemplary embodiment, the wheel hub is supported on opposite sides of the output gear by way of an outboard bearing inserted into the outboard case and an inboard bearing inserted into the lower opening.

In another exemplary embodiment, a spacer is disposed between the output gear and the backwall. In another exemplary embodiment, a lower outboard seal is disposed between outboard bearing and the wheel hub. In another exemplary embodiment, a lower inboard seal is disposed between the inboard bearing and an inboard cap supported by a lower through bolt. In another exemplary embodiment, the lower through bolt supports the output gear assembly within the lower opening. In another exemplary embodiment, the lower through bolt extends through the wheel hub and receives a lower through nut outboard of the wheel hub. In another exemplary embodiment, a lock washer and a nut retainer are disposed between the lower through nut and the wheel hub.

In an exemplary embodiment, a portal spindle assembly for a vehicle front suspension comprises: a spindle portion configured for being rotatably coupled with an upper connecting and a lower connecting arm; a leading-edge portion configured for being rotatably coupled with a steering rod-end joint; an inboard case and an outboard case configured to support a pinion gear assembly within an upper opening of the inboard case and support an output gear assembly within a lower opening of the inboard case; a wheel hub coupled with the output gear assembly and configured to receive a front wheel; and a sealing surface disposed around a perimeter of the inboard case and configured for forming a fluid-tight seal with the outboard case.

In another exemplary embodiment, the pinion gear assembly is configured to be engaged with an outboard constant velocity joint for communicating torque from a transaxle to the pinion gear assembly. In another exemplary embodiment, the pinion gear assembly is meshed with the output gear assembly such that torque is communicated from the outboard constant velocity joint to the wheel hub. In another exemplary embodiment, the pinion gear assembly is longitudinally aligned along a pinion axis that is disposed at an angle with respect to a hub axis of the output gear assembly. In another exemplary embodiment, the angle between the pinion axis and the hub axis is configured to orient the outboard constant velocity joint toward the transaxle. In another exemplary embodiment, the angle between the pinion axis and the hub axis ranges between substantially 1-degree and 25-degrees. In another exemplary embodiment, the angle between the pinion axis and the hub axis is configured to facilitate a suspension geometry that provides a camber change of the front wheel that eliminates a change in track width.

In another exemplary embodiment, the lower opening includes a lower mounting hole and an upper mounting hole that are configured to receive a lower connecting arm bolt for mounting a lower connecting arm joint within the lower opening. In another exemplary embodiment, the lower mounting hole is configured to receive a misalignment spacer comprising the lower connecting arm joint. In another exemplary embodiment, the spindle portion includes an upper mounting hole for coupling the spindle portion with the upper connecting arm. In another exemplary embodiment, the upper mounting hole is configured to receive a misalignment spacer comprising an upper connecting arm joint. In another exemplary embodiment, the leading-edge portion includes two parallel prongs extending forward with respect to the spindle portion, the parallel prongs being configured to fixedly receive a bolt that hingedly receives the steering rod-end joint, such that moving the steering rod-end joint rotates the spindle assembly with respect to the upper connecting arm and the lower connecting arm.

In an exemplary embodiment, a method for a portal spindle assembly for a vehicle front suspension comprises: coupling a spindle portion with an upper connecting arm and a lower connecting arm; coupling a leading-edge portion with a steering rod-end joint; mounting a pinion gear assembly between an upper opening of an inboard case and an outboard case; supporting an output gear assembly between a lower opening of the inboard case and the outboard case; and forming a fluid-tight seal between the inboard case and the outboard case.

In another exemplary embodiment, the method further includes fastening the pinion gear assembly to an outboard constant velocity joint for communicating torque from a transaxle to the pinion gear assembly. In another exemplary embodiment, the method further includes meshing the pinion gear assembly with the output gear assembly for communicating torque from the pinion gear assembly to the output gear assembly. In another exemplary embodiment, the method further includes attaching a front wheel to a wheel hub comprising the output gear assembly for communicating torque from the pinion gear assembly to the front wheel.

In another exemplary embodiment, mounting includes forming an angle between a pinion axis of the pinion gear assembly and a hub axis of the output gear assembly. In another exemplary embodiment, forming the angle includes orienting the pinion axis so as to direct an outboard constant velocity joint toward a transaxle. In another exemplary embodiment, forming the angle comprises establishing an angle ranging between substantially 1-degree and 25-degrees. In another exemplary embodiment, forming the angle comprises establishing an angle that facilitates a suspension geometry that provides a camber change of the front wheel that eliminates a change in track width.

In an exemplary embodiment, a method for a portal spindle assembly for a vehicle front suspension comprises: configuring a spindle portion for being rotatably coupled with an upper connecting arm and a lower connecting arm; configuring a leading-edge portion for being rotatably coupled with a steering rod-end joint; forming an inboard case that includes an upper opening and a lower opening surrounded by a backwall; forming an outboard case to cooperate with the inboard case to house a pinion gear assembly and an output gear assembly; supporting the pinion gear assembly within the upper opening by way of the outboard case; and supporting the output gear assembly within the lower opening by way of the outboard case.

In another exemplary embodiment, supporting the pinion gear assembly includes forming an angle between a pinion axis of the pinion gear assembly and a hub axis of the output gear assembly. In another exemplary embodiment, forming the angle includes orienting the pinion axis so as to direct an outboard constant velocity joint toward a transaxle. In another exemplary embodiment, forming the angle comprises establishing an angle ranging between substantially 1-degree and 25-degrees. In another exemplary embodiment, forming the angle comprises establishing an angle that facilitates a suspension geometry that provides a camber change of the front wheel that eliminates a change in track width.

In another exemplary embodiment, supporting the pinion gear assembly includes coupling the pinion gear assembly with an outboard constant velocity joint for communicating torque from a transaxle to the pinion gear assembly. In another exemplary embodiment, supporting the pinion gear assembly further includes meshing the pinion gear assembly with the output gear assembly for communicating torque from the pinion gear assembly to the output gear assembly. In another exemplary embodiment, supporting the output gear assembly includes coupling the output gear assembly with a front wheel by way of a wheel hub for communicating torque from the pinion gear assembly to the front wheel.

BRIEF DESCRIPTION OF THE DRAWINGS

The drawings refer to embodiments of the present disclosure in which.

Figure 1:
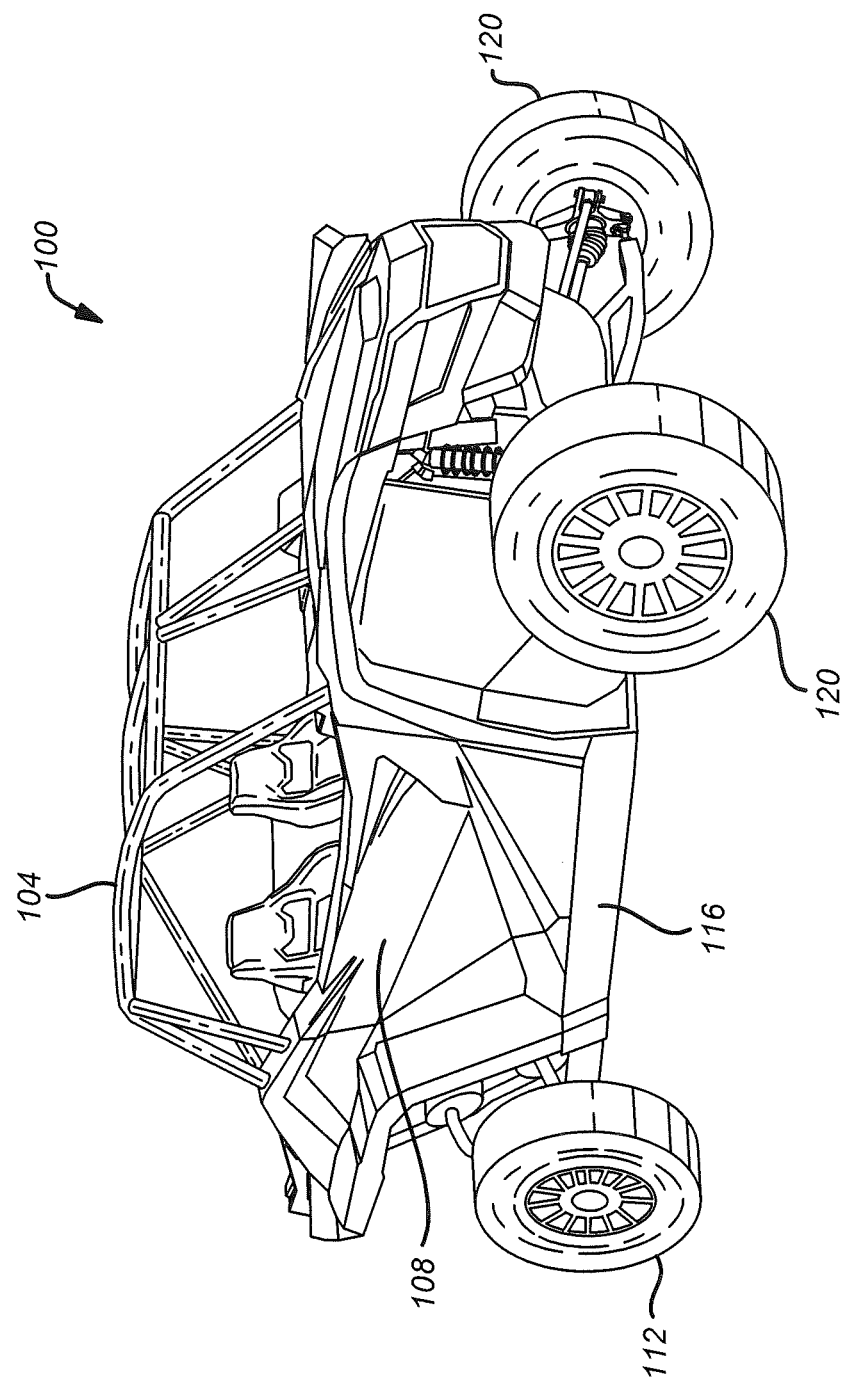
FIG. 1 illustrates an exemplary embodiment of an off-road vehicle that is particularly suitable for implementation of an off-road front suspension system in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first joint," may be made. However, the specific numeric reference should not be interpreted as a literal sequential order but rather interpreted that the "first joint" is different than a "second joint." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

A double wishbone suspension generally comprises upper and lower suspension arms that operably couple a front wheel of a vehicle. The upper and lower suspension arms each typically include two mounting points to a chassis of the vehicle and one mounting joint at a spindle assembly. The spindle assembly is coupled between the outboard ends of the upper and lower suspension arms and is configured to allow vertical and horizontal radial movement of a wheel coupled with the spindle assembly. Constant velocity (CV) joints allow pivoting of the suspension arms and the spindle assembly, while a drive shaft coupled to the CV joint delivers power to the wheel. Given that off-road vehicles routinely travel over very rough terrain, such as mountainous regions, there is a desire to improve the mechanical strength and performance of off-road drivetrain and suspension systems, while at the same reducing the mechanical complexity of such systems. Embodiments of the disclosure provide to an apparatus and methods for a front portal spindle assembly that improves the mechanical strength and performance of off-road drivetrains.

FIG. 1 shows an off-road vehicle 100 that is particularly suitable for implementation of an off-road front suspension system in accordance with the present disclosure. As disclosed hereinabove, the off-road vehicle 100 generally is of a Utility Task Vehicle (UTV) variety that seats two occupants, includes a roll-over protection system 104, and may have a cab enclosure 108. Rear wheels 112 of the off-road vehicle 100 may be operably coupled with a chassis 116 by way of a trailing arm suspension system. Front wheels 120 may be operably coupled with the chassis 116 by way of the front suspension system and the portal spindle assembly discussed herein. It should be understood, however, that the portal spindle assembly disclosed herein is not to be limited to the off-road vehicle 100, but rather the portal spindle assembly may be incorporated into a wide variety of vehicles, other than UTVs, without limitation.

Figure 2:
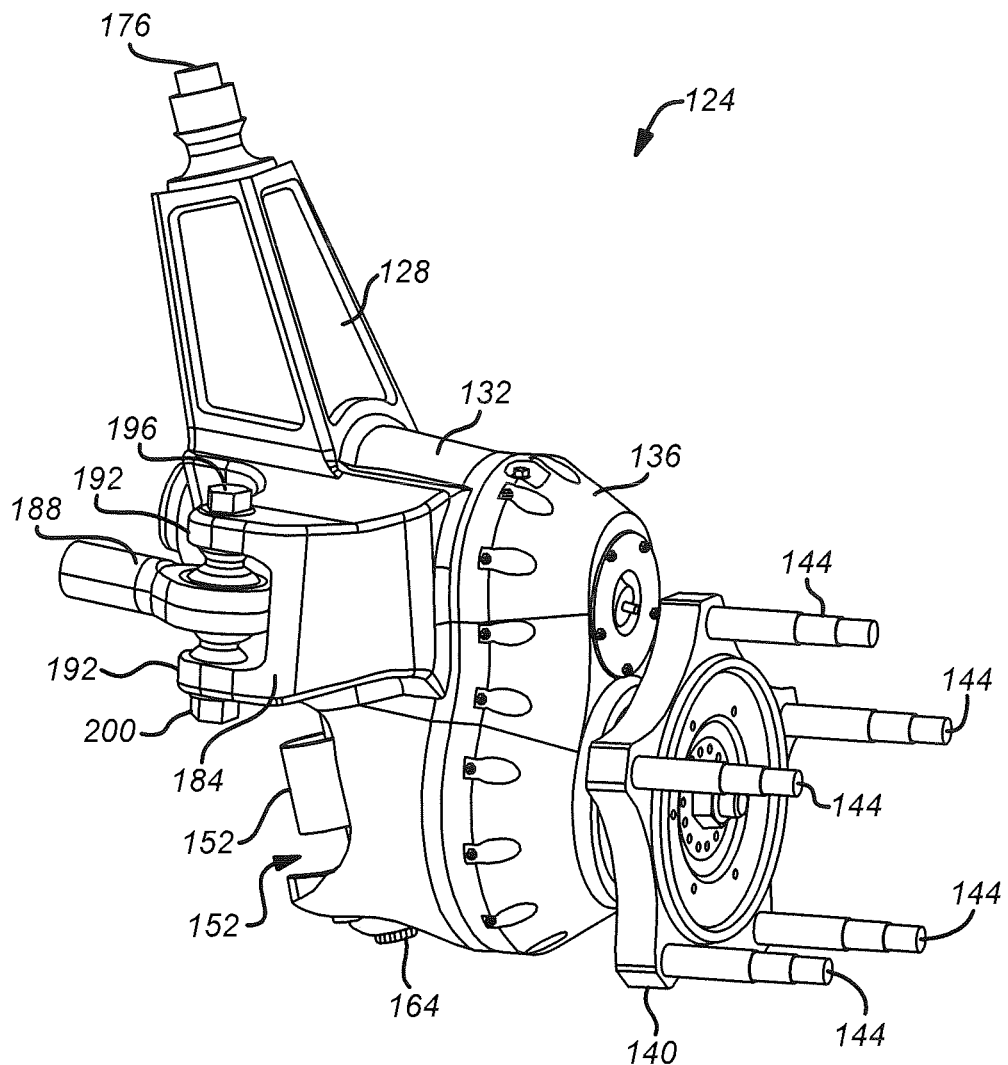
FIG. 2 illustrates a front view of an exemplary embodiment of a front portal spindle assembly that is configured to couple a front wheel with a driver side of an off-road vehicle.

FIG. 2 illustrates a front view of a front portal spindle assembly 124 that is configured to couple the front wheel 120 with a driver side of the off-road vehicle 100. The portal spindle assembly 124 (hereinafter, "spindle assembly 124") includes a spindle portion 128 and an inboard case 132 that are coupled with an outboard case 136. The inboard case 132 and the outboard case 136 cooperate to support a pinion gear assembly and an output gear assembly that are configured to communicate torque from a transaxle onboard the vehicle 100 to the front wheel 120. A wheel hub 140 and multiple wheel studs 144 facilitate coupling the front wheel 120 with the output gear assembly. The pinion gear assembly and the output gear assembly are discussed in detail herein below.

Figure 3:
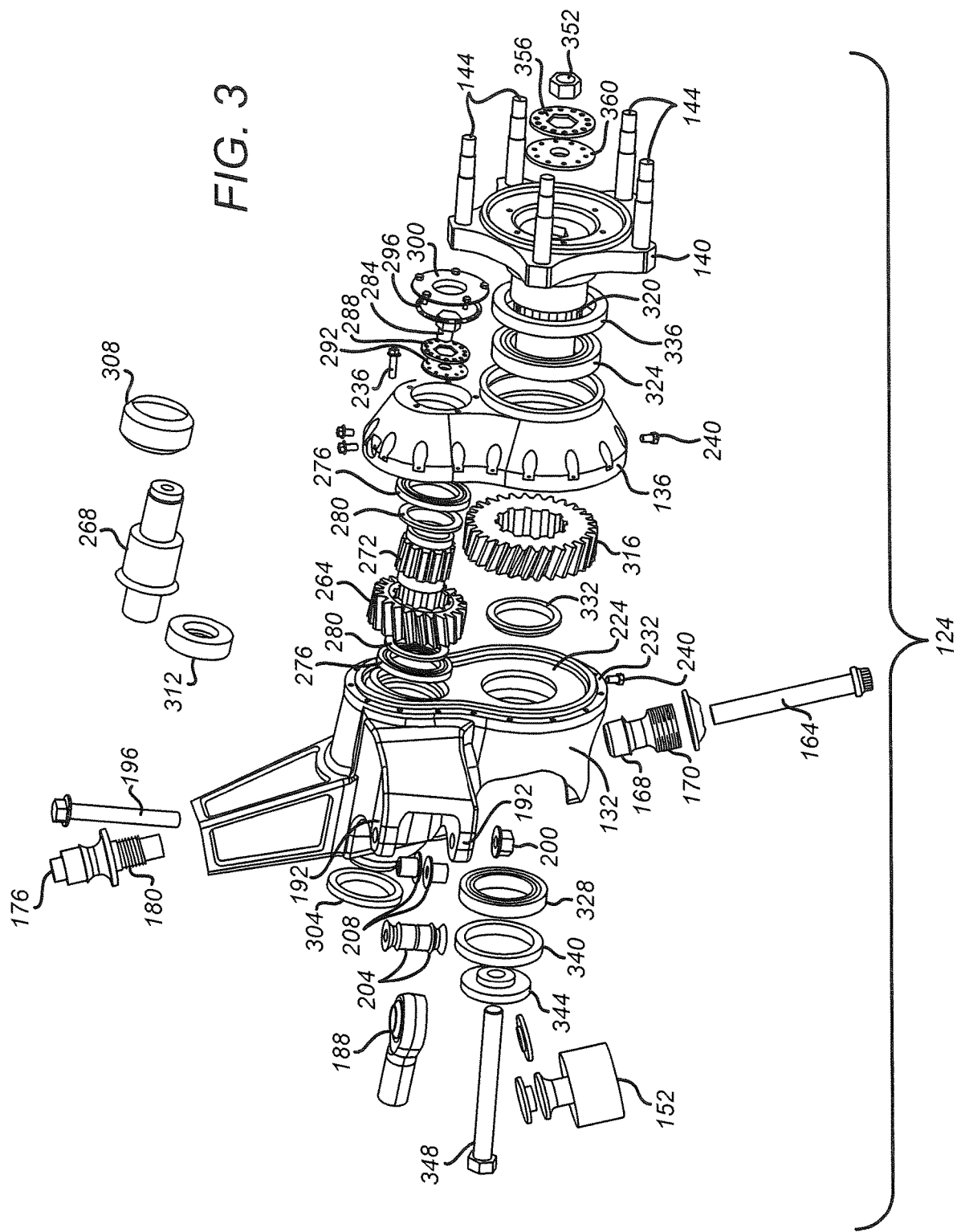
FIG. 3 illustrates an exploded view of the exemplary embodiment of the front portal spindle assembly shown in FIG. 2.
Figure 4:
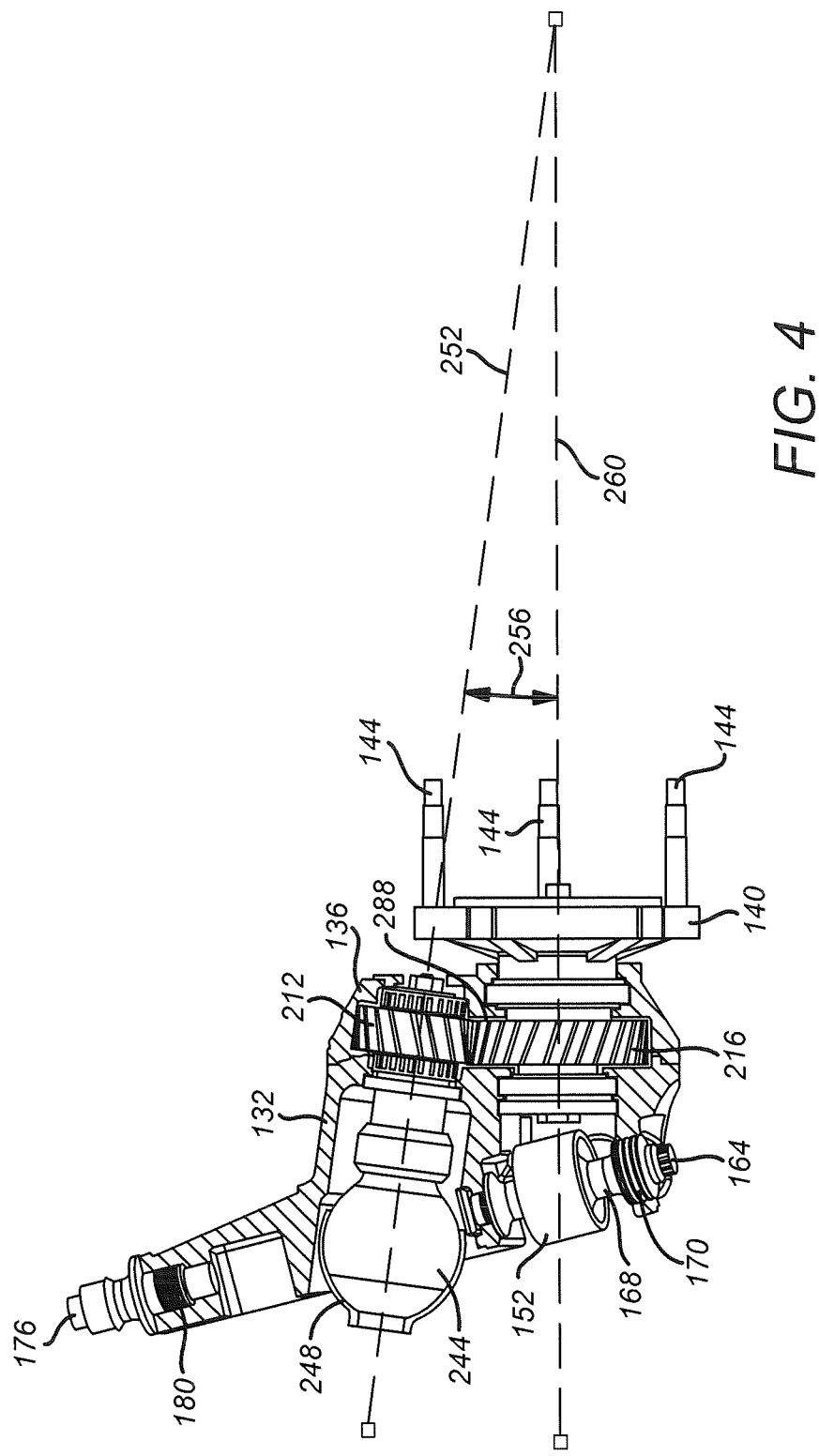
FIG. 4 illustrates a cross-sectional view of the exemplary embodiment of the front portal spindle assembly shown in FIG. 2.

The spindle portion 128 and the inboard case 132 are configured for being rotatably coupled with upper and lower connecting arms (not shown) comprising the front suspension. As best shown in FIGS. 5-8, the outboard case 132 includes a lower opening 148 that is configured to receive a lower connecting arm joint 152 for coupling the spindle assembly 124 with the lower connecting arm. The lower opening 148 includes a lower mounting hole 156 and an upper mounting hole 160 (see FIG. 8) that are configured to receive a lower connecting arm bolt 164 (see FIG. 3) for mounting the lower connecting arm joint 152 within the lower opening 148. In some embodiments, the lower mounting hole 156 is configured to receive a misalignment spacer 168 comprising the lower connecting arm joint 152. It is contemplated that the misalignment spacer 168 generally includes threads 170 configured to engage with threads disposed within the lower mounting hole 156, as shown in FIG. 4.

Figure 6:
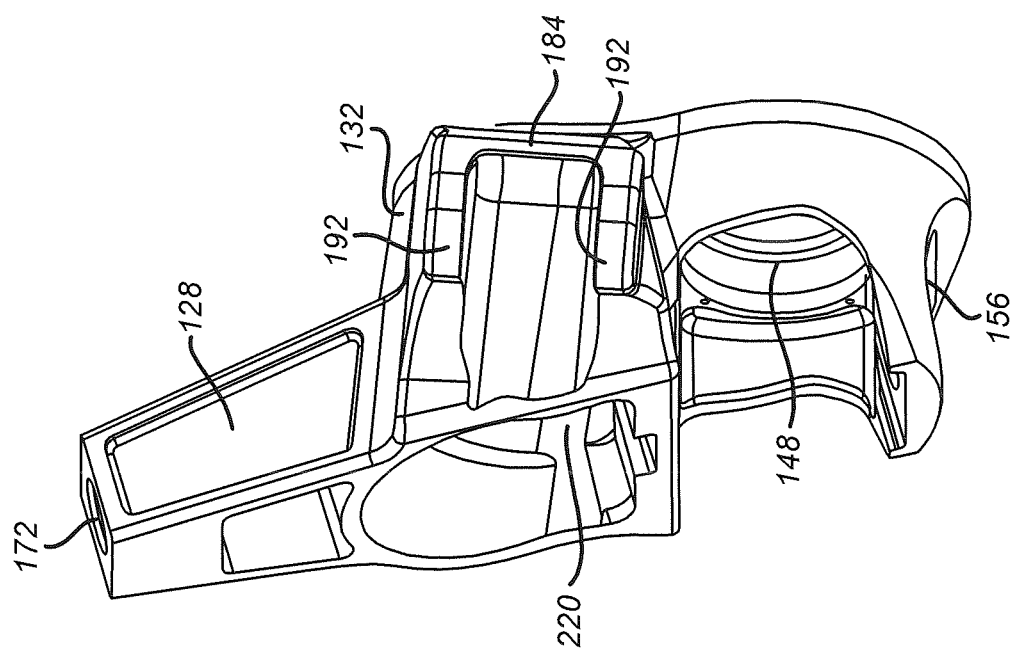
FIG. 6 illustrates an inboard view of the leading-edge of the inboard case of FIG. 5.
Figure 5:
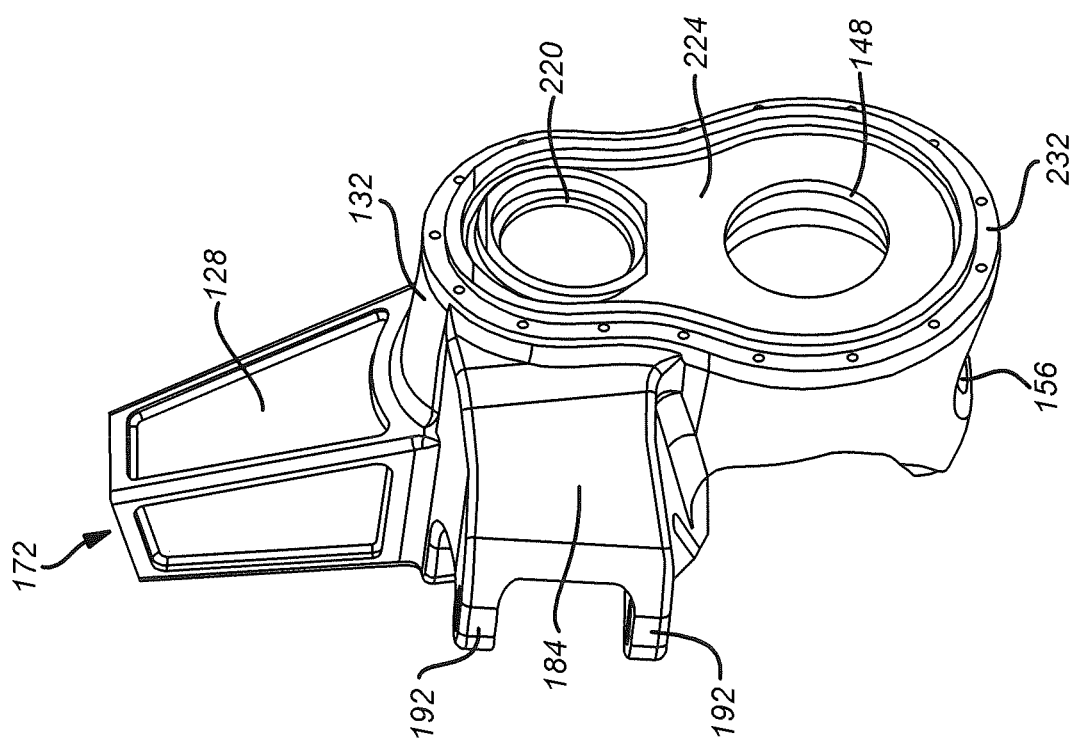
FIG. 5 illustrates an outboard view of a leading-edge of an exemplary embodiment of an inboard case comprising the front portal spindle assembly of FIG. 2.
Figure 8:
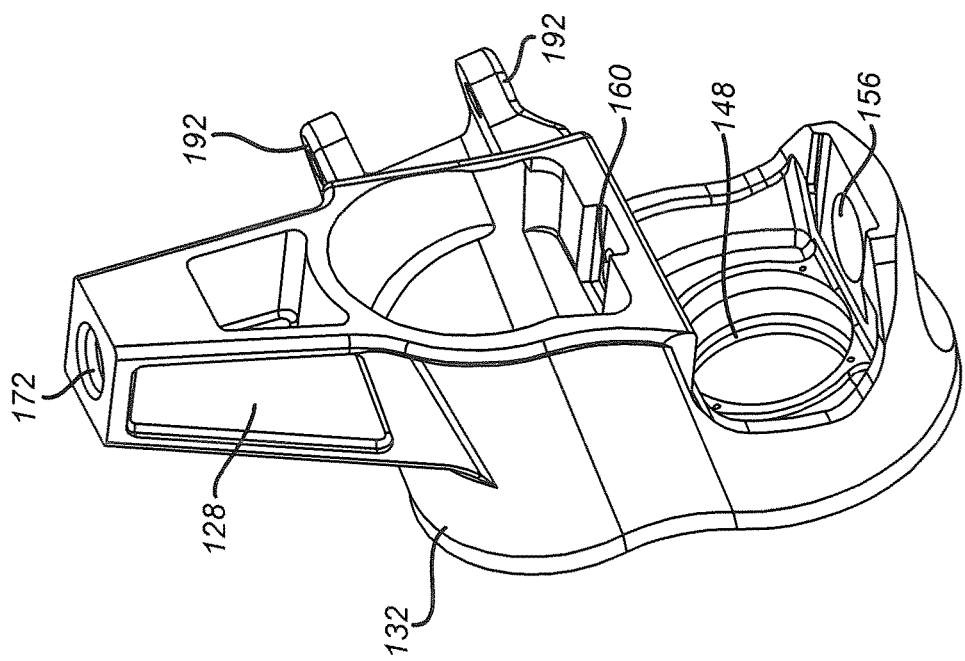
FIG. 8 illustrates an inboard view of the following edge of the inboard case of FIG. 5.
Figure 7:
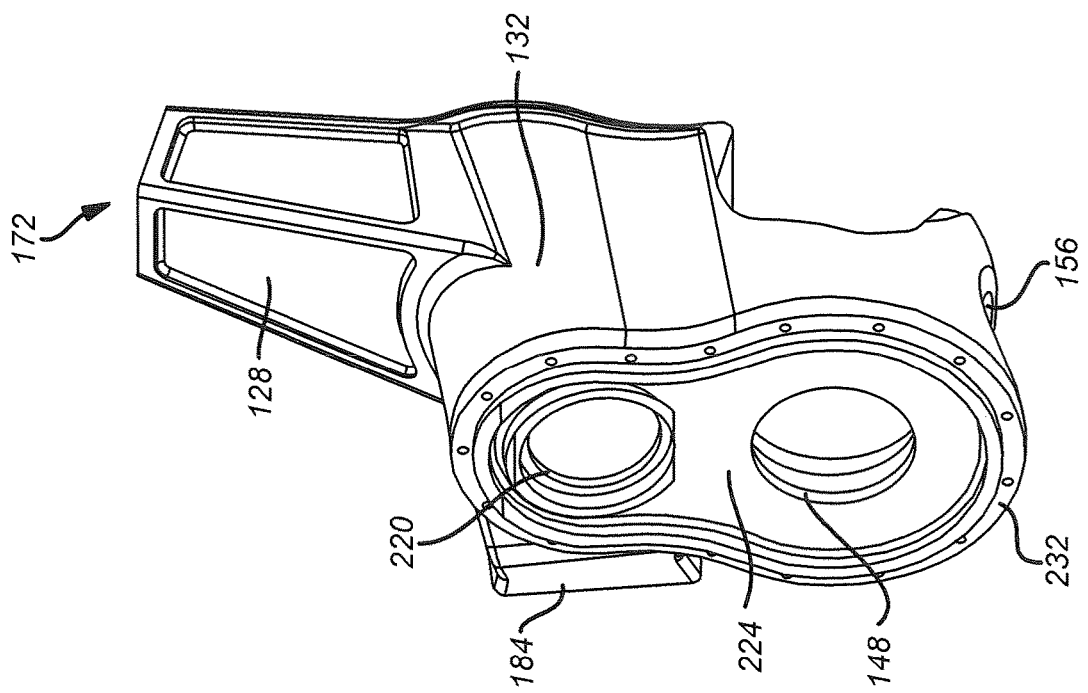
FIG. 7 illustrates an outboard view of a following edge of the inboard case of FIG. 5.

As best shown in FIGS. 6 and 8, the spindle portion 128 includes an upper mounting hole 172 for coupling the spindle assembly 124 with the upper connecting arm. In the illustrated embodiment, the upper mounting hole 172 is configured to receive a misalignment spacer 176 (see FIG. 3) comprising an upper connecting arm joint (not shown). As shown in FIG. 3, the misalignment spacer 176 includes threads 180 configured to engage with threads disposed within the upper mounting hole 172. As will be appreciated, the threads 180 facilitate fastening the misalignment spacer 176 to the spindle portion 128, as shown in FIG. 4.

It is contemplated that the upper connecting arm joint and the lower connecting arm joint 152 facilitate horizontal rotation of the spindle assembly 124 due to steering the vehicle 100, as well as accommodating vertical movement of the spindle assembly 124 due to operation of the front suspension during the vehicle 100 traveling over terrain. In some embodiments, either or both of the upper connecting arm joint and the lower connecting arm joint 152 may be of a rod-end, or monoball, variety of joint. Details pertaining to rod-end joints and monoballs are disclosed in U.S. patent application Ser. No. 15/625,692, entitled "Rod-End Front Suspension," filed on Jun. 16, 2017, the entirety of which is incorporated herein by reference.

Turning again to FIG. 2, the spindle assembly 124 includes a leading-edge portion 184 that is configured for being rotatably coupled with a steering rod-end joint 188. As will be appreciated, the steering rod-end joint 188 generally facilitates coupling a steering rod (not shown) with the spindle assembly 124, such that moving the steering rod causes the spindle assembly 124 to rotate horizontally with respect to the upper connecting arm and the lower connecting arm. In the illustrated embodiment, the leading-edge portion 184 includes two parallel prongs 192 extending forward with respect to the spindle portion 128. The parallel prongs 192 are configured to fixedly receive a bolt 196 and a nut 200 that hingedly receives the steering rod-end joint 188, such that moving the steering rod-end joint 188 rotates the spindle assembly 124 with respect to the connecting arms, as described herein.

As best shown in FIG. 3, the parallel prongs 192 are configured to fastenably receive one or more misalignment spacers 204 comprising the steering rod-end joint 188. Further, the parallel prongs 192 are configured to fastenably receive one or more steering arm top hats 208 for hingedly mounting the steering rod-end joint 188 between the parallel prongs 192. It is contemplated that, in some embodiments, the steering rod-end joint 188 may be of a rod-end, or monoball, variety of joint. Details pertaining to rod-end joints and monoballs are disclosed in above-mentioned U.S. patent application Ser. No. 15/625,692, which is entitled "Rod-End Front Suspension." Further, details pertaining to leading-edge steering systems are disclosed in U.S. patent application Ser. No. 15/625,813, entitled "Leading-Edge Steering Assembly," filed on Jun. 16, 2017, the entirety of which is incorporated herein by reference.

As disclosed hereinabove and shown in FIG. 4, the inboard case 132 and the outboard case 136 are configured to cooperate to support a pinion gear assembly 212 and an output gear assembly 216 that are configured to communicate torque from a transaxle onboard the vehicle 100 to the front wheel 120. As best shown in FIGS. 5-8, the inboard case 132 includes an upper opening 220 and a lower opening that extend through a backwall 224 of the inboard case 132. The upper opening 220 is configured to receive the pinion gear assembly 212, and the lower opening 148 is configured to receive the output gear assembly 216. In general, the backwall 224 cooperates with the outboard case 136 to form a cavity 228 that supports the gear assemblies 212, 216, as shown in FIG. 4. As shown in FIGS. 5-8, the inboard case 132 includes a sealing surface 232 disposed around a perimeter of the inboard case 132. The sealing surface 232 is configured for forming a fluid-tight union with a similar sealing surface disposed around the perimeter of the outboard case 136. A multiplicity of case bolts 236 (see FIG. 3) may be used to couple the outboard case 136 to the inboard case 132. As will be appreciated, any of various suitable gaskets may be placed between the sealing surface 232 and the sealing surface of the outboard case 136 such that the fluid-tight union is capable of retaining a suitable lubricant, such as oil, within the cavity 228. Further, one or more oil-drain screws 240 (see FIG. 3) may be incorporated into the cases 132, 136 so as to enable draining the lubricant from the cavity 228 for periodic servicing of the spindle assembly 124.

As best illustrated in FIG. 4, the gear assemblies 212, 216 are housed within the cavity 228 such that the pinion gear assembly 212 is meshed with the output gear assembly 216. As such, torque applied to the pinion gear assembly 212 is communicated to the output gear assembly 216. The pinion gear assembly 212 is configured to be engaged with an outboard constant velocity joint (not shown) for communicating torque from a transaxle onboard the vehicle 100 to the pinion gear assembly 212. An adapter 244 and a protective boot 248 are configured to facilitate coupling the outboard constant velocity joint with the pinion gear assembly 212. Further, the output gear assembly 216 is engaged with the wheel hub 140. Thus, torque from the transaxle may be communicated to the front wheel 120 by way of the pinion gear assembly 212 and the output gear assembly 216.

With continuing reference to FIG. 4, the pinion gear assembly 212 is longitudinally aligned along a pinion axis 252 that is disposed at an angle 256 relative to a hub axis 260 with which the output gear assembly 216 is longitudinally aligned. In general, the angle 256 is configured to orient the pinion gear assembly 212, and thus the outboard constant velocity joint, toward the transaxle. Experimental observation has shown that the angle 256 generally ranging between substantially 1-degree and 25-degrees facilitates configuring a suspension geometry that provides a camber change of the front wheel 120 that substantially eliminates a change in track width during vertical motion of the spindle assembly 124 due to terrain. Further, experimental observation has demonstrated that the angle 256 ranging between substantially 1-degree and 15-degrees provides an optimal camber change of the front wheel 120 that eliminates a change in track width and prevents exceeding an articulation angle of the constant velocity joints during vertical motion of the spindle assembly 124 due to terrain.

Returning again to FIG. 3, the pinion gear assembly 212 includes a pinion gear 264 that is coupled with a constant velocity stub shaft 268 by way of a spline adapter 272. The spline adapter 272 is supported at opposite ends by way of a bearing 276 inserted into each of the upper opening 220 and the outboard case 136. A spacer 280 is disposed between each bearing 276 and the pinion gear 264. An outboard end of the constant velocity stub shaft 268 is rotatably mounted to the outboard case 136 by way of a retaining bolt 284, a lock washer 288, and a bolt retainer 292. An O-ring 296 and an outboard cap 300 are configured to enclose the pinion gear assembly 212 within the outboard case 136. Further, an upper inboard seal 304 and a retaining collar 308 support the constant velocity stub shaft 268 within the upper opening 220. As such, an inboard end of the constant velocity stub shaft 268 is configured to be coupled with an outboard constant velocity joint. A constant velocity spacer 312 is configured to be disposed between the outboard constant velocity joint and the constant velocity stub shaft 268.

With continuing reference to FIG. 3, the output gear assembly 216 includes an output gear 316 coupled with the wheel hub 140 by way of a spline adapter portion 320 of the wheel hub 140. The wheel hub 140 is supported on opposite sides of the output gear 316 by way of an outboard bearing 324 inserted into the outboard case 136 and an inboard bearing 328 inserted into the lower opening 148. A spacer 332 mounted onto the wheel hub and disposed within the lower opening 148 separates the output gear 316 and the backwall 224. Further, a lower outboard seal 336 is disposed between outboard bearing 324 and the wheel hub 140, and a lower inboard seal 340 is disposed between the inboard bearing 328 and an inboard cap 344 supported by a lower through bolt 348. As will be recognized, the seals 336, 340 operate to keep the lubricant from leaking out of the cavity 228 during operation of the spindle assembly 124. The lower through bolt 348 extends through the wheel hub 140 and receives a lower through nut 352 outboard of the wheel hub 140, and thus the lower through bolt 348 and the lower through nut 352 cooperate to support the output gear assembly 216 within the lower opening 148. Further, a lock washer 356 and a nut retainer 360 are disposed between the lower through nut 352 and the wheel hub 140.

Figure 9:
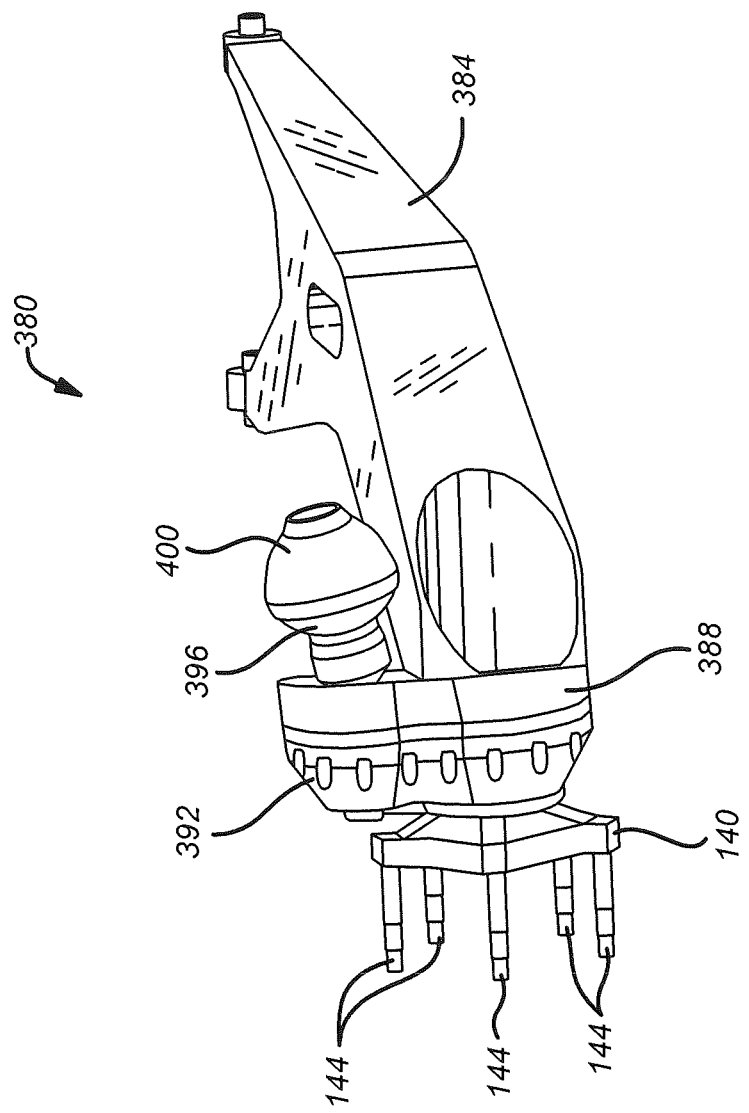
FIG. 9 illustrates an exemplary embodiment of a rear portal trailing arm assembly in accordance with the present disclosure.

It is to be understood that the portal assembly disclosed herein is not to be limited to front suspensions of off-road vehicles 100, but rather the portal assembly may be incorporated into rear suspensions of off-road vehicles 100, without limitation. For example, FIG. 9 illustrates an exemplary embodiment of a rear portal trailing arm assembly 380 that includes a portal assembly that is substantially similar to the spindle assembly 124 discussed hereinabove. The rear portal trailing arm assembly 380 (hereinafter, "trailing arm assembly 380") includes a trailing arm 384 and an inboard case 388 that are coupled with an outboard case 392. The inboard case 388 and the outboard case 392 cooperate to support a pinion gear assembly 212 and an output gear assembly 216 (see FIGS. 3 and 4) that are configured to communicate torque from a transaxle onboard the vehicle 100 to a rear wheel 112 (see FIG. 1). A wheel hub 140 and multiple wheel studs 144 facilitate coupling the rear wheel 112 with the output gear assembly 216. The pinion gear assembly 212 and the output gear assembly 216 are discussed in detail hereinabove with respect to FIGS. 3 and 4.

As will be appreciated, the inboard case 388 and the outboard case 392 cooperate to house the gear assembles 212, 216 within an interior cavity that is substantially identical to the cavity 228 disclosed in connection with FIG. 4. It should be understood, therefore, that the gear assembles 212, 216 are meshed within the inboard case 388 and the outboard case 392, such that torque applied to the pinion gear assembly 212 is ultimately communicated to the rear wheel 112 (see FIG. 1) coupled with the output gear assembly 216. The pinion gear assembly 212 is configured to be engaged with an outboard constant velocity joint (not shown) for communicating torque from a transaxle onboard the vehicle 100 to the pinion gear assembly 212. As best shown in FIG. 9, an adapter 396 and a protective boot 400 are configured to facilitate coupling the outboard constant velocity joint with the pinion gear assembly 212.

Moreover, the gear assembles 212, 216 incorporated into the trailing arm assembly 380 generally share an angle, such as the angle 256 as discussed with respect to FIG. 4. Thus, the pinion gear assembly 212 is longitudinally aligned along a pinion axis that is disposed at an angle relative to a hub axis with which the output gear assembly 216 is longitudinally aligned. It is contemplated that the angle may be configured to orient the pinion gear assembly 212 and the outboard constant velocity joint toward the transaxle. As disclosed hereinabove, experimental observation has shown that an angle generally ranging between substantially 1-degree and 25-degrees facilitates configuring a suspension geometry that provides a camber change of the rear wheel 112 that substantially eliminates a change in track width during vertical motion of the trailing arm assembly 380 due to terrain. More specifically, experimental observation has demonstrated that an angle ranging between substantially 1-degree and 15-degrees provides an optimal camber change of the rear wheel 112 that eliminates a change in track width and prevents exceeding an articulation angle of the constant velocity joints during vertical motion of the trailing arm assembly 380 due to terrain.

Methods for a portal spindle assembly 124 for a vehicle front suspension may comprise, in some embodiments, coupling a spindle portion 128 with an upper connecting arm and a lower connecting arm; coupling a leading-edge portion 184 with a steering rod-end joint 188; mounting a pinion gear assembly 212 between an upper opening 220 of an inboard case 132 and an outboard case 136; supporting an output gear assembly 216 between a lower opening 148 of the inboard case 132 and the outboard case 136; and forming a fluid-tight seal between the inboard case 132 and the outboard case 136.

The methods may further include, in some embodiments, fastening the pinion gear assembly 212 to an outboard constant velocity joint for communicating torque from a transaxle to the pinion gear assembly 212. In some embodiments, the methods may further include meshing the pinion gear assembly 212 with the output gear assembly 216 for communicating torque from the pinion gear assembly 212 to the output gear assembly 216. In some embodiments, the methods may further include attaching a front wheel 120 to a wheel hub 140 comprising the output gear assembly 216 for communicating torque from the pinion gear assembly 212 to the front wheel 120.

Moreover, in some embodiments, the methods may include forming an angle 256 between a pinion axis 252 of the pinion gear assembly 212 and a hub axis 260 of the output gear assembly 216. In some embodiments, forming the angle 256 includes orienting the pinion axis 252 so as to direct the outboard constant velocity joint toward the transaxle. In some embodiments, forming the angle 256 may comprise establishing an angle ranging between substantially 1-degree and 25-degrees. In some embodiments, forming the angle 256 may comprise establishing an angle that facilitates a suspension geometry that provides a camber change of the front wheel 120 that eliminates a change in track width.

In some embodiments, methods for a portal spindle assembly 124 for a vehicle front suspension comprise configuring a spindle portion 128 for being rotatably coupled with an upper connecting arm and a lower connecting arm; configuring a leading-edge portion 184 for being rotatably coupled with a steering rod-end joint 188; forming an inboard case 132 that includes an upper opening 220 and a lower opening 148 surrounded by a backwall 224; forming an outboard case 136 to cooperate with the inboard case 132 to house a pinion gear assembly 212 and an output gear assembly 216; supporting the pinion gear assembly 212 within the upper opening 220 by way of the outboard case 136; and supporting the output gear assembly 216 within the lower opening 148 by way of the outboard case 136.

In some embodiments, the methods may include forming an angle 256 between a pinion axis 252 of the pinion gear assembly 212 and a hub axis 260 of the output gear assembly 216. Forming the angle 256 may include, in some embodiments, orienting the pinion axis 252 so as to direct an outboard constant velocity joint toward a transaxle. In some embodiments, forming the angle 256 may comprise establishing an angle ranging between substantially 1-degree and 25-degrees. Further, in some embodiments, forming the angle 256 may comprise establishing an angle that facilitates a suspension geometry that provides a camber change of the front wheel 120 that eliminates a change in track width.

In some embodiments, supporting the pinion gear assembly 212 may include coupling the pinion gear assembly 212 with an outboard constant velocity joint for communicating torque from a transaxle to the pinion gear assembly 212. Supporting the pinion gear assembly 212 may further include, in some embodiments, meshing the pinion gear assembly 212 with the output gear assembly 216 for communicating torque from the pinion gear assembly 212 to the output gear assembly 216. In some embodiments, supporting the output gear assembly 216 may include coupling the output gear assembly 216 with a front wheel 120 by way of a wheel hub 140 for communicating torque from the pinion gear assembly 216 to the front wheel 120.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A portal spindle assembly for a vehicle front suspension, the spindle assembly comprising:
 a spindle portion configured for being rotatably coupled with an upper connecting arm and a lower connecting arm;
 a leading-edge portion configured for being rotatably coupled with a steering rod-end joint;
 an inboard case and an outboard case configured to support a pinion gear assembly within an upper opening of the inboard case and support an output gear assembly within a lower opening of the inboard case;

the lower opening having a lower mounting hole and an upper mounting hole that are configured to receive a lower connecting arm bolt;

a wheel hub coupled with the output gear assembly and configured to receive a front wheel; and a sealing surface disposed around a perimeter of the inboard case and configured for forming a fluid-tight seal with the outboard case.

2. The spindle assembly of claim 1, wherein the pinion gear assembly is configured to be engaged with an outboard constant velocity joint for communicating torque from a transaxle to the pinion gear assembly.

3. The spindle assembly of claim 2, wherein the pinion gear assembly is meshed with the output gear assembly such that torque is communicated from the outboard constant velocity joint to the wheel hub.

4. The spindle assembly of claim 3, wherein the pinion gear assembly is longitudinally aligned along a pinion axis that is disposed at an angle with respect to a hub axis of the output gear assembly.

5. The spindle assembly of claim 4, wherein the angle between the pinion axis and the hub axis is configured to orient the outboard constant velocity joint toward the transaxle.

6. The spindle assembly of claim 5, wherein the angle between the pinion axis and the hub axis ranges between substantially 1-degree and 25-degrees.

7. The spindle assembly of claim 5, wherein the angle between the pinion axis and the hub axis is configured to facilitate a suspension geometry that provides a camber change of the front wheel that eliminates a change in track width.

8. The spindle assembly of claim 1, wherein the lower opening includes a lower mounting hole and an upper mounting hole that are configured to receive a lower connecting arm bolt for mounting a lower connecting arm joint within the lower opening.

9. The spindle assembly of claim 8, wherein the lower mounting hole is configured to receive a misalignment spacer comprising the lower connecting arm joint.

10. The spindle assembly of claim 1, wherein the spindle portion includes an upper mounting hole for coupling the spindle portion with the upper connecting arm.

11. The spindle assembly of claim 10, wherein the upper mounting hole is configured to receive a misalignment spacer comprising an upper connecting arm joint.

12. The spindle assembly of claim 1, wherein the leading-edge portion includes two parallel prongs extending forward with respect to the spindle portion, the parallel prongs being configured to fixedly receive a bolt that hingedly receives the steering rod-end joint, such that moving the steering rod-end joint rotates the spindle assembly with respect to the upper connecting arm and the lower connecting arm.

13. A method for a portal spindle assembly for a vehicle front suspension, the method comprising:

configuring a spindle portion for being rotatably coupled with an upper connecting arm and a lower connecting arm;

configuring a leading-edge portion for being rotatably coupled with a steering rod-end joint;

forming an inboard case that includes an upper opening and a lower opening disposed in a backwall;

forming an outboard case to cooperate with the inboard case to house a pinion gear assembly and an output gear assembly wherein forming the outboard case includes forming an angle between a pinion axis of the pinion gear assembly and a hub axis of the output gear assembly, the angle orienting an outboard constant velocity joint toward a transaxle;

supporting the pinion gear assembly within the upper opening by way of the outboard case; and supporting the output gear assembly within the lower opening by way of the outboard case.

14. The method of claim 13, wherein forming the angle comprises establishing an angle ranging between substantially 1-degree and 25-degrees.

15. The method of claim 13, wherein forming the angle comprises establishing an angle that facilitates a suspension geometry that provides a camber change of the front wheel that eliminates a change in track width.

16. The method of claim 13, wherein supporting the pinion gear assembly further includes meshing the pinion gear assembly with the output gear assembly for communicating torque from the pinion gear assembly to a wheel hub by way of the output gear assembly.

* * * * *